US009506753B2

(12) United States Patent
Lippuner et al.

(10) Patent No.: US 9,506,753 B2
(45) Date of Patent: Nov. 29, 2016

(54) TILT SENSOR FOR A DEVICE AND METHOD FOR DETERMINING THE TILT OF A DEVICE

(75) Inventors: Heinz Lippuner, Rebstein (CH); Bernhard Metzler, Dornbirn (AT); Werner Amann, Feldkirch (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 726 days.

(21) Appl. No.: 13/810,645

(22) PCT Filed: Aug. 22, 2011

(86) PCT No.: PCT/EP2011/064388
§ 371 (c)(1),
(2), (4) Date: Jan. 16, 2013

(87) PCT Pub. No.: WO2012/025491
PCT Pub. Date: Mar. 1, 2012

(65) Prior Publication Data
US 2014/0198207 A1    Jul. 17, 2014

(30) Foreign Application Priority Data

Aug. 23, 2010  (EP) .................................... 10173726

(51) Int. Cl.
*G01N 15/06*    (2006.01)
*G01C 9/20*    (2006.01)
*G01C 9/06*    (2006.01)

(52) U.S. Cl.
CPC .. *G01C 9/20* (2013.01); *G01C 9/06* (2013.01)

(58) Field of Classification Search
CPC ........................................................ G01C 9/20
USPC .......................... 250/573; 33/366.12, 366.16
See application file for complete search history.

(56) References Cited

U.S. PATENT DOCUMENTS 4,307,516 A * 12/1981 Walker ...................... 33/366.12
2002/0014590 A1    2/2002 Johnson

FOREIGN PATENT DOCUMENTS

CN          1030640 A      1/1989
CN         28856932 Y      1/2007
(Continued)

OTHER PUBLICATIONS

Translation of International Preliminary Report on Patentability and Written Opinion issued Feb. 26, 2013 in PCT Patent Application No. PCT/EP2011/064388.
European Search Report mailed Jan. 18, 2011 in priority European Patent Application No. EP10173726.
(Continued)

*Primary Examiner* — Thanh Luu
(74) *Attorney, Agent, or Firm* — Maschoff Brennan

(57) ABSTRACT

The invention relates to a tilt sensor for a device, comprising a tank receiving a flowable medium, wherein the position of the medium relative to the tank depends on the tilt, and the tank comprises a polygonal, in particular triangular, or an elliptical, in particular circular base, a source of electromagnetic radiation for generating projections of at least one part of a boundary of the medium, at least two detectors for detecting one of the projections, respectively, and for converting same into signals, wherein the detectors each comprise a detecting direction and the detecting directions of the detectors are disposed at angles to each other, and further comprising an analysis unit for determining the tilt in two axes from the signals of the at least two detectors, wherein the tilt is determined jointly for the two axes from a combination of the signals.

27 Claims, 7 Drawing Sheets

(56) References Cited

FOREIGN PATENT DOCUMENTS

| DE | 4110858 A1 | 10/1992 |
|---|---|---|
| EP | 1511971 A1 | 3/2005 |
| JP | 2004-012203 A | 1/2004 |

OTHER PUBLICATIONS

International Search Report mailed Nov. 16, 2011 in PCT Patent Application No. PCT/EP2011/064388.
Translation of Chinese Office Action dated Jul. 22, 2014 in application No. 201180040682.3.

* cited by examiner

TILT SENSOR FOR A DEVICE AND METHOD FOR DETERMINING THE TILT OF A DEVICE

FIELD OF THE INVENTION

The invention relates to a tilt sensor for a device and to a method for determining the tilt of a device.

BACKGROUND

Tilt sensors are employed in a wide variety of measuring instruments and are used in conjunction therewith in order to determine the orientation of the instrument or in order to confirm or reach a required position of a device. Such sensors are used particularly in the building industry and in the field of geodesy. In order to ensure that the coordinate determination of a target mark is carried out correctly and the position of a surveying device is in this case taken into account, besides the location of the device it is necessary to be able to record accurately its position relative to the Earth's gravitational field. Sensors of various designs are already known for the purpose of this tilt determination.

US 2002/0014590 A1 presents a tilt sensor having a CCD array as a detector. The sensors of the array are located on a wall of a container, which is in turn partially filled with a liquid. The tilt is determined by reading out the signals of the individual CCD sensors on the array and comparing them with one another.

The disadvantage of this sensor is that the measurement of the tilt can only be carried out in one direction. For the determination of an absolute tilt in two axes relative to a horizontal, a further measurement must be carried out after changing the location of the sensor or an additional second sensor of the same design must be used.

The laid-open specification DE 41 10 858 relates to a biaxial inclinometer, in which a geometrical figure is projected by means of a tilt-sensitive and beam-deflecting sensor onto a linear array. The sensor contains a liquid, the position of which relative to the device leads to influencing or deflection of the projection of the figure on the linear array.

Besides the disadvantages which are due to the complexity of their structure, inclinometers of this design are miniaturizable only to a limited extent owing to the required minimum length of the beam paths for two elementary beams.

EP 1 511 971 discloses an optical inclinometer in which radiation is emitted by a radiation source and is imaged onto a camera after passing through a holding element, which in particular contains a liquid. In this arrangement, the tilt of the inclinometer can be deduced from the position of the liquid horizontal relative to the inclinometer, or the camera. Recording the position of the medium by a camera furthermore permits evaluation of a multiplicity of features, in particular shape, extent and position of a boundary layer.

A disadvantage with this configuration is that the tilt can be carried out accurately only in one direction, referred to as longitudinal tilt, and the determination in a second direction, referred to as transverse tilt, is carried out with the aid of spreading of the image of the boundary layer. The variation of this image width can turn out to be very small for a minor variation of the transverse tilt, and can therefore be resolved and evaluated only with limited accuracy.

SUMMARY

It is the object of the present invention to provide a tilt sensor and a method which permit exact determination of the absolute tilt of a device in space, while having improved measurement accuracy and a solid angle measurement range which is as large as possible.

It is another object of the invention to provide a tilt sensor which can be integrated better into measuring devices owing to its simple and compact embodiment.

A tilt sensor according to the invention comprises at least one radiation source, with which a liquid in a vessel is illuminated so that an image of the boundary layer of the liquid is generated on two or more cameras by this illumination. The radiation source may to this end emit light in the optically perceptible wavelength range, although it may also be configured in such a way that radiation in a visually imperceptible range is emitted. So that an image respectively corresponding to the currently existing tilt can be recorded on the cameras, the liquid has the property that it is tilt-dependent relative to the vessel while forming a substantially planar interface, in particular a horizontal, as a function of the shape and size of the vessel. The cameras are arranged in such a way that they respectively record at least a part of the boundary layer of the liquid while simultaneously being located at an angle to one another with respect to their viewing direction. They are additionally intended to convert the recorded images into signals and, for this purpose, may for example be configured as CCD arrays or surface sensors. The tilt sensor furthermore comprises an evaluation unit, with which the tilt can be determined from the signals of the cameras by combining the signals with one another and very accurately determining therefrom an absolute tilt of the sensor, i.e. a tilt in two directions, relative to the Earth's gravitational field. This tilt determination can be carried out jointly for the two directions owing to the spatial arrangement of the cameras. For example, the position of a device and the deviation of the position from the Earth's gravitational field in two mutually perpendicular directions can thereby be determined by just one measurement with a sensor according to the invention.

A tilt sensor according to the invention is employed, for example, in the field of geodetic surveying. In order to survey points in a landscape, geodetic measuring devices, for example a total station, are used. If the coordinates of a target mark, which is used as a measurement point, are intended to be determined, then starting from a known location the distance and simultaneously the angle to this point are determined by means of a measurement beam. In order to be able to ensure accurate coordinate determination of the point, the tilt angle of the measuring device relative to the Earth's gravitational field must jointly be taken into account in this case for the angle determination.

To this end, a tilt sensor according to the invention may be integrated into a surveying device. It is advantageous in this case that the sensor can be installed easily in the device and can accurately determine the tilt of the device simultaneously in two directions, i.e. for two axes of the device. The function of this tilt sensor is maintained even for the case of an overhead measurement and therefore makes it possible to use the surveying device for such tasks. This is made possible by an arrangement, according to the invention, of the cameras, for example perpendicular to a triangular base surface, their viewing directions intersecting inside the vessel and the required signals thus being recordable. With a triangular vessel base surface, the space requirement necessary for mounting the sensor can furthermore be kept small. The measurement data of this sensor are combined with the angle and distance measurement data of the total station, and the exact spatial coordinates of the target mark are determined therefrom.

An alternative field of application for tilt sensors is that of coordinate measurement machines with an articulated arm. These devices are used for the measurement of object surfaces carried out with high accuracy, particularly in the manufacturing industry, for which the measurement and checking of workpiece surfaces is of great importance. In this case, a plurality of members or arm sections connected to one another in a mobile fashion are arranged between the two ends of the articulated arm, so that a measurement end of the arm comprising a sampling member is freely movable within a section of space, the other end of the arm being connected to a base. Furthermore, the articulations of the arm are assigned position measuring instruments so that a placement or orientation of the members with respect to one another, i.e. a relative position respectively between the members, can respectively be measured. To this end, for example, angle meters and/or length meters are used which determine length, rotation or pivot angles as measurement variables. For accurate measurement of objects, the position of the base must furthermore be known. For this position determination, a tilt sensor according to the invention may be provided on the base, the measurement data of said tilt sensor in turn being combined with the data of the angle meter and/or length meter of the coordinate measurement machine and making the exact location of the sampling member in space derivable therefrom.

Besides the aforementioned triangular base surface, the vessel of the sensor may have a polygonal or even elliptical, in particular circular shape, in which case the vessel walls as well as the cameras may likewise be arranged perpendicularly to this base surface. With these embodiments, the necessary space requirement of the sensor can be further optimized according to its intended field of use. In both embodiments, the cameras for recording the images, or projections, of the interface of the liquid may be integrated directly into the vessel walls or alternatively they lie parallel to the vessel walls, which in particular are transparent. Images which are generated in the case of such an elliptical or other polygonal vessel embodiment can lead to profiles of the projected boundary layer which differ from a straight line. Such vessels may, for example, be simple metal boxes or small polygonal compartments made of acrylic glass.

Besides the shapes and dimensions of the vessel, the position of the camera with respect to the vessel walls is also relevant for determining the tilt. For this reason, the cameras are arranged in particular in such a way that their viewing directions are aligned parallel with the base surface of the vessel and accurate recording of images, and concomitantly the determination of the tilt, can therefore be carried out.

To this end, the cameras may be configured as detectors with a wide variety of designs. For example, line or surface sensors offer the advantage that, for the respective detector size, a corresponding area can be detected and recorded in a pointwise-resolved fashion. Surface sensors may additionally be configured in their respective size, as well as in their shapes, corresponding to the vessel walls and thereby provide a maximal recording surface. In particular, to this end the cameras may be selected with dimensioning which covers the vessel.

So that a larger amount of data can be recorded and evaluated, and an increase in the accuracy of the tilt determination is achieved, one or more further cameras may be added to the necessary two cameras. The viewing direction of this third camera may lie in the plane which is formed by the viewing direction of the other two cameras. As an alternative thereto, the viewing direction of the third camera may be oriented at an angle to the plane which is formed.

In order to record a part, in particular a common part, of the interface, the cameras may be arranged in such a way that their viewing directions, or surface normals through the sensor center, intersect at a point, this point lying in particular inside the vessel and being located at a defined height above the base surface. In particular, this point of intersection lies vertically above the surface centroid of the container base surface. Thus, in the case of a vessel with a triangular base surface and vertical walls, the detectors may for example respectively be fitted centrally and parallel to the walls and then have a common point of intersection above the surface centroid of the base surface.

Since silicone oils usually have a low viscosity and permit rapid measurement owing to their low inertia, these are employed in particular as a suitable liquid in a tilt sensor according to the invention. Possible movements of liquids, for example wave formation or turbulence at the liquid surface, can thereby be dampened, and measurements can be carried out in rapid succession with high accuracy in comparison with other liquids.

The determination of the tilt is carried out by using a method according to the invention. After the images of the liquid surface have been generated on the cameras, they are converted into signals, the cameras being arranged at an angle to one another with respect to their viewing direction, so that the boundary line can be recorded from different directions. The signals are then combined with one another and further processed in such a way that the information necessary for determining the tilt can already be derived from the combination. In particular, the position of the liquid as recorded on the cameras can be determined therefrom and in turn set in relation to the position of the cameras, and the absolute position or the tilt of the sensor, or of a device connected thereto, can be deduced from these relative locations. In order to determine the tilt for a single axis, the presence of just one camera is sufficient, the signal of which is used for derivation of the tilt.

In order to determine the aforementioned relative locations of cameras with respect to the liquid surface, a surface may be derived from the recorded images of the cameras, this surface in turn representing at least parts of the boundary layer of the liquid in the position in which the images were recorded, the cameras being directed at the interface from different viewing angles during the recording.

In order to derive the surface, the images are recorded on the cameras and, in particular, resolved into individual image points thereon. The higher the possible resolution of the cameras is in this case, i.e. the greater the number of image points recordable per unit area is, the higher is the accuracy with which the derivation of a surface on the basis thereof can be carried out. The resolved images are then converted into signals in such a way that they respectively represent a recorded boundary line as a two-dimensional point cloud and each signal contains information such as to make an image of the previously recorded boundary line of the liquid reconstructable for each camera. This may be done by using various methods of fitting calculation, for example with the method of "least squares", for example by calculating a fitting curve for each point cloud generated and in turn deriving a corresponding surface from at least two of these curves. The more image points per unit area are available for the derivation of a curve here, the more accurately it can be calculated since, for each image point, a square error of its location from an imaginary curve can be calculated with the aid of its coordinates on the camera. The position of the curve can subsequently be adapted until the sum of the square errors of all image points reaches a minimum value. In this position, the curve represents most accurately the profile of the point cloud, or of the boundary line, and a surface further calculated therefrom represents the surface profile of the liquid very well. For the accuracy of this surface calculation, the number of curves used therefor is relevant in so far as the surface can be fitted further according to the described procedure by each additional curve.

An alternative method for the surface determination may be the direct derivation thereof—likewise by fitting calculation—from the point clouds of at least two or more cameras, without employing a previous curve calculation therefor. To this end, the point clouds provided by the two or more cameras are used directly and a surface is adapted to all these points. For the accuracy of the calculation, it here again applies that it increases with an increase in the amount of information introduced into the calculation. The determination of the curves or surfaces may also be carried out by calculating a plurality of elementary curves or elementary surfaces and combining these elements stepwise to form an overall curve or surface and/or using them for its orientation.

Furthermore, in the event of unsharp imaging, the boundary line of the liquid surface may be represented not by a point sequence substantially corresponding to a line but instead by an extended surface of scattered image points, which does not have a sharp contour. From such imaging unsharpness, which may for example be caused during the recording by the camera, the boundary line profile can be derived with the aid of the statistical distribution of the resolved image points of the point cloud and calculation of curves and a surface can thus be carried out. To this extent, an image does not necessarily have to mean the generation of an optically sharp image, but rather the projection recordable and evaluable by a detector.

In addition, the occurrence of perturbations, for example foam, bubble formation, impurities or as a result of vibrations, on the liquid surface may hinder optically sharp imaging of a boundary line. As a result, the profile of the boundary line can no longer be determined uniquely and instead only a diffuse surface is imaged on the camera, from which the boundary line profile can likewise be derived through the statistical distribution of the resolved image points of the point cloud, and therefore calculation of curves and a surface can be carried out. In particular, such foam formation may contribute to compensation for irregularities or curvatures in the boundary line profile, in which case, for example, wave formation or wetting effects in the liquid profile may already be at least partially compensated for, or impurities in the liquid may be covered, by this spreading of the boundary line.

With increasing miniaturization of the tilt sensor, wetting effects which may occur at the edge of the liquid container simultaneously have a greater effect on the recorded part of the profile of the boundary line, and for very small embodiments of the sensor may dominate, and in particular entirely prevent, the formation of an at least partially straight boundary line profile. While recorded images of a camera show a virtually plane, horizontalized profile of a liquid surface for large containers, in this case a curved line rather than a straight line will be projected. For correct surface and tilt determination, curvatures of the liquid surface which are due to these effects must therefore jointly be taken into account.

A curve and/or surface determination may to this end alternatively be carried out by using models for the calculation, which describe the profile of a liquid surface and the wetting behavior of a liquid on a surface, in particular the profile of a meniscus formed on a vessel surface. In this way, it is possible to determine a curve or a surface which represents the profile of the liquid surface in such a way that wetting effects that occur are taken into account and curvatures possibly occurring, particularly in the edge region, are represented by the curve profile. A corresponding model may furthermore be used to determine a curve profile or surface profile directly from the point cloud which represents a curved curve or surface, in such a way that this profile corresponds to a straight line or plane so that meniscus correction is carried out as computational elimination of the curvature influences caused by the meniscus, at least in the edge region. To this end, for example, fitting of the curves or surfaces at their edges is carried out in such a way that existing curvatures are straightened by calculation on a model basis and the effect of wetting is thereby factored out, or the profile of the calculated curves or surfaces is thus adapted to a straight-line or planar profile. Straight-line calculation of the profile may also be carried out statistically by calculating a slope for the points or for point groups, in particular for points in those regions in which there is a curved line, for example by calculating the determination of a fitting line with the method of "least squares" and correcting the position of the points with the aid of the slope. A piecewise linear approximation of the boundary line profile may furthermore be carried out, for example by determining elementary straight lines for point groups so that, with the aid of the slope of the elementary straight lines, correction of the boundary line profile into a straight line can be carried out or elementary straight lines can be combined and the slopes of these straight lines can in turn be employed for the correction of a boundary line profile. For these calculations and in order to form point groups, a threshold value may additionally be taken into account for the slope differences of straight lines.

By the straight-line calculation of the line or surface profile with the aid of models or by statistical calculations, a plane can be calculated from the recorded point clouds directly, or by resorting to straight lines calculated therefrom, with which plane further steps can be carried out, in particular the calculation of a normal vector of the plane, in order to determine a tilt.

If, on the other hand, surfaces are calculated directly from point clouds, or from curves which are derived from point clouds, without further correction of the curvature, then a calculation of an approximated tangential plane to the surfaces may be carried out for the further determination of the tilt, on the basis of which further calculation steps may in turn be carried out.

In order to determine the tangential plane, various methods may be used. In particular, a search may be made in the surface profile for extreme values, in particular for minima or maxima depending on the orientation of the sensor, and, at the location of extrema which are found, a plane may be constructed which touches i.e. is tangent to the surface. Furthermore, a plane may be calculated such that it has a maximum number of touching points to the previously calculated surface and thus, for surface profiles whose curvature is pronounced to differing extents over the entire surface, with this possibility a horizontally oriented plane may be generated.

Furthermore, a tangential plane may also be calculated directly from a point cloud without surfaces or curves already calculated therefor having to be employed. For example, a distribution of the image points of a point cloud may be considered and, from this distribution, a plane may be adapted in such a way that horizontalization is achieved by weighting or correction of the location of individual points. To this end, fitting lines may in turn be calculated for point pairs, or for a plurality of points of the point cloud, and with the aid of the slope of these straight lines the location of points may be corrected, particularly in regions in which an imaged boundary line does not extend straight, in such a way that after the correction the points describe a tangential plane to the point cloud.

Precisely such models may furthermore be used for direct determination of a normal vector, which is directed parallel to the gravitational field, from a point cloud. This direct derivation of a normal vector may also be carried out with the aid of the aforementioned statistical methods, in particular by direction contributions being determined for each point and/or for point groups of the point cloud, in particular by a slope determination, and assigned to a vector. To this end, regions with accumulations of points additionally may be taken into account more strongly than regions which have a relatively small number of points.

As an alternative thereto, a normal vector may be mathematically determined on the basis of the previously determined tangential plane, said normal vector thus always standing perpendicularly on the plane. If a calculated tangential plane is available and the condition that this plane has a horizontalized orientation is therefore satisfied, then the normal vector points in the direction of the Earth's gravitational field. The relative position of the vector with respect to the cameras, or the detectors, may be regarded after this calculation step as known or mathematically accurately determinable. By derivation of the coordinates of the vector and setting in relation to the respective detectors, their position with respect to the horizontal can be determined. With this common procedure for at least two detectors, the orientation of the tilt sensor, or of a device in which this sensor is integrated, can be determined jointly for two axes and therefore absolutely. The determination of the tilt may be carried out according to this procedure for just one axis by using a single detector.

Besides this type of tilt determination, as an alternative or in addition thereto the tilt may be derived by a comparison of two vectors. To this end, the coordinates of a reference vector, which likewise represents a normal to the liquid, may be defined for the sensor or for a device comprising this sensor in a horizontal orientation. In order to determine the tilt, it is in turn possible to employ a normal vector derived as above, the calculated direction of which is compared with that of the reference vector. From a direction difference possibly resulting therefrom, the tilt of the sensor in any desired spatial direction can be determined directly.

For the calculated curves, surfaces, straight lines or planes, a quality value may additionally be determined, which, for example, indicates the accuracy with which the calculation has been carried out and how great a possible error of this accuracy is. This quantity may be used to make the accuracy or correctness of a measurement carried out communicable to a user of a device comprising a tilt sensor. Furthermore, the calculated quality value may be used to automatically or manually adapt individual control parameters of the tilt sensor. For example, the intensity of the illumination of the medium or the sensitivity of a detector may be varied on the basis of a poor quality value, so that the projection onto a detector can for example be recorded with richer contrast in a subsequent measurement.

In addition, the accuracy of the tilt determination may be increased by carrying out the recording and conversion of the signals continuously and, in particular, cumulating the signals in the evaluation unit. Curves, surfaces, straight lines, planes and the normal vector may then in turn be derived from the cumulated signals in the manner described. If a measuring device comprising a tilt sensor according to the invention remains, for example, at a defined location, then, by the accumulation of signals, average values for the signals can be determined or regions in a point cloud belonging to a signal, which for example comprise a concentration of points, may be defined. By using the average values or by weighting the point concentrations, it is then possible for curves, surfaces, straight lines or planes to be derived continuously and with increasing accuracy.

An additional aspect of the invention—the wetting effect of the liquid at the edge of the container—is taken into account by a further embodiment according to the invention. To this end, a tilt sensor for a device has a container holding a flowable medium, the position of the medium relative to the container being tilt-dependent and the container being capable of having a polygonal, in particular triangular, or elliptical, in particular circular, base surface. Furthermore, a source of electromagnetic radiation for generating projections of at least a part of an interface of the medium, and at least two detectors for respectively recording one of the projections and for conversion into signals, are provided, the detectors respectively having a recording direction and the recording directions of the detectors being arranged at an angle to one another. In addition, there is an evaluation unit for determining the tilt in two axes from the signals of the at least two detectors. The tilt is determined jointly from the combination of the signals for the two axes, a surface, in particular a curved surface, being derived from point clouds.

A corresponding method for determining the tilt of a device, with a flowable medium whose relative position with respect to a container holding it is tilt-dependent, comprises generation of at least two projections of at least a part, in particular a common part, of an interface of the medium. Recording of the respective projection by a respectively assigned one of at least two detectors and conversion of the respectively recorded projection into signals, the interface being recorded from two recording directions at an angle to one another, and determination of the tilt from the signals, are furthermore provided. From a combination of the signals, the tilt in two axes is determined jointly; during the determination of the tilt signals are combined in such a way that a surface, in particular a curved surface, is determined therefrom, the surface representing the interface of the medium, and in particular approximating a profile of the interface.

BRIEF DESCRIPTION OF THE DRAWINGS

The method according to the invention and the apparatus according to the invention will be described in more detail below purely by way of example with the aid of specific exemplary embodiments schematically represented in the drawings, further advantages of the invention also being discussed. In detail.

DETAILED DESCRIPTION

Figure 1:
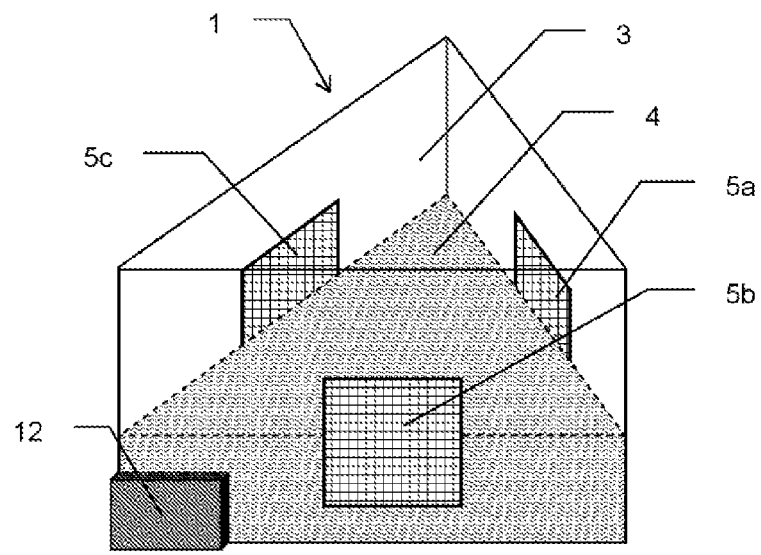
FIG. 1 shows a first embodiment of a tilt sensor according to the invention having a triangular base surface.

FIG. 1 shows a tilt sensor 1 according to the invention for determining the tilt of a device in two axes. The tilt sensor 1 has a container 3 with a triangular base surface, the container walls being perpendicular to the base surface, and the detectors 5a, 5b, 5c for respectively recording a projection and for conversion into signals being arranged on these walls. The container 3 is in this case partially filled with a flowable medium 4, which is tilt-dependent relative to the container 3, so that the detectors 5a, 5b, 5c in a horizontalized orientation are at least partially covered by the medium 4 and can record generated projections of in this case a part of the interface of the medium 4. An evaluation unit 12 is provided for determining the tilt of the sensor 1 in two axes from the signals of the detectors 5a, 5b, 5c, which are arranged at an angle to one another with respect to their recording directions, the tilt being determinable jointly from the combination of the signals for the two axes.

Figure 2:
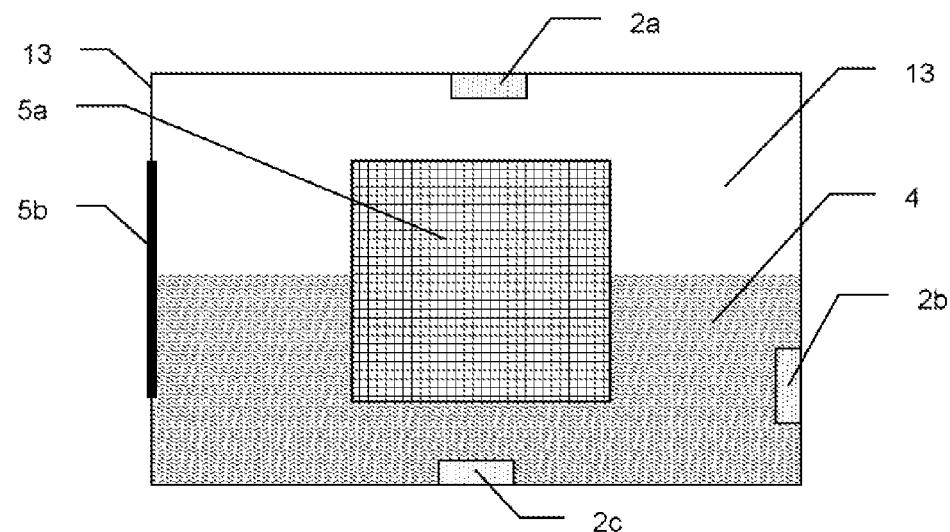
FIG. 2 shows a second embodiment of the tilt sensor in side view.

FIG. 2 shows a second embodiment of the tilt sensor 1 in a side view. The two detectors 5a, 5b are arranged centrally on the respective container wall 13, while being partially covered by the medium 4. In addition, sources of electromagnetic radiation 2a, 2b, 2c are arranged in such a way that they generate projections of at least a part of the interface of the medium 4 on the detectors 5a, 5b.

Figure 3:
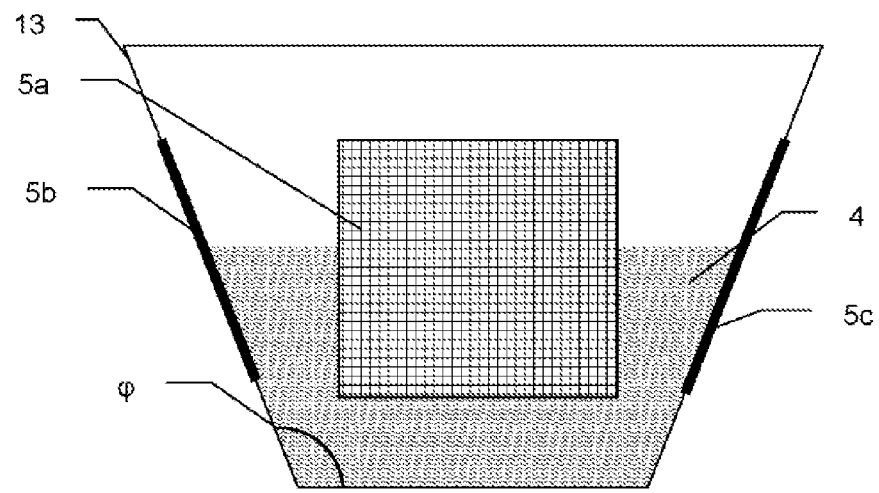
FIG. 3 shows a third embodiment of the tilt sensor having oblique container walls in side view.

FIG. 3 shows a third embodiment of the tilt sensor 1 in a side view. The detectors 5a, 5b, 5c are arranged centrally on the respective container wall 13, while being partially covered by the medium 4. In contrast to the previous embodiment, the container walls 13 are in this case not perpendicular to the base surface of the container, but are arranged at an angle φ thereto.

Figure 4A:
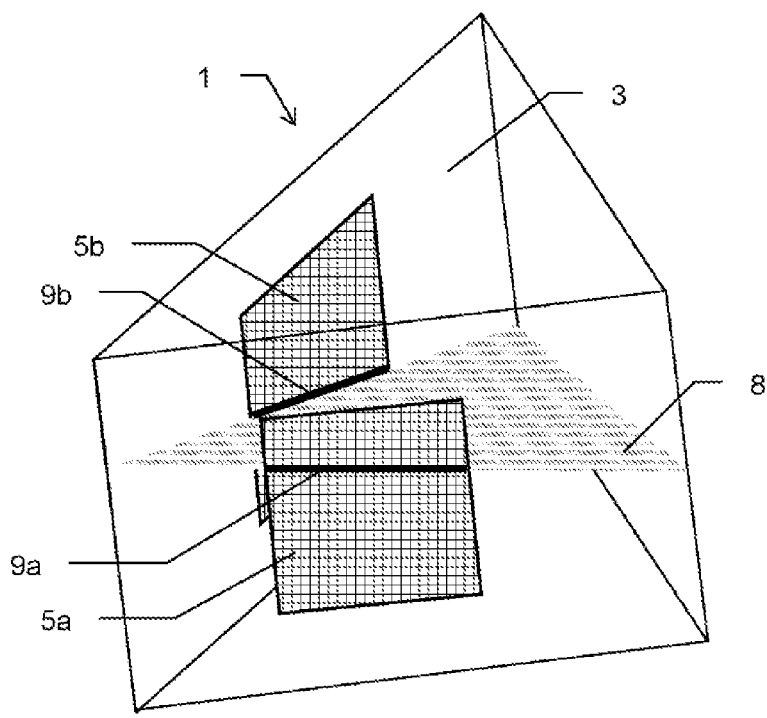
FIG. 4a shows a perspective representation of a fourth embodiment of a tilt sensor according to the invention in the tilted state.

FIG. 4a shows a perspective view of a fourth embodiment of the tilt sensor 1 in a tilted state. The container 3 in this case has a triangular base surface and two detectors 5a, 5b, which are respectively arranged on the container walls, the interface 8 of the flowable medium being present in the container 3 in such a way that projections 9a, 9b of the medium which are respectively generated on the detectors can be recorded.

Figure 4B:
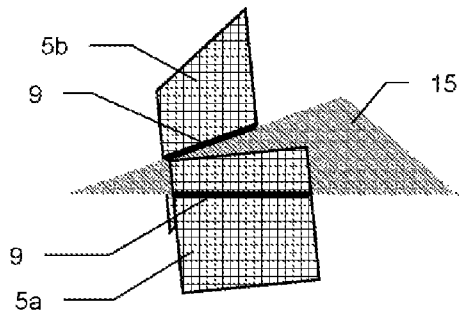
FIG. 4b shows the detectors of a tilt sensor according to the invention with a calculated surface.

In FIG. 4b, the detectors 5a, 5b of FIG. 4a, which are configured as surface sensors, are likewise represented in the tilted state described above. The projections 9a, 9b created on the interface of the medium are respectively present on the detectors 5a, 5b and are converted into signals. Furthermore, these signals can be combined by determining a surface 15 therefrom, this in turn representing the interface of the medium, and in particular approximating the profile of the interface. The projections are furthermore resolved into image points by the respective detector 5a, 5b, so that the signals represent the interface as a two-dimensional point cloud. The surface 15 may be derived from the point clouds of the detectors 5a, 5b directly, in particular by fitting calculation.

Besides the determination of a surface 15, a curve may also respectively be derived from the point clouds, in which case this derivation may likewise be carried out by fitting calculation. Furthermore, a quality value for the calculation of the surface 15 and/or of the curves may be determined and, in particular, a parameter, for example an illumination intensity, for the generation of the at least two projections may be adapted from the point clouds.

Figure 4C:
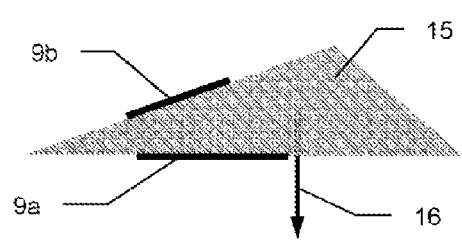
FIG. 4c shows a derived surface with an associated normal vector.

FIG. 4c furthermore shows a normal vector 16, calculated during the determination of the tilt, of the derived surface 15. With the aid of this vector 16, a tilt of the sensor 1 in two axes can be determined by the relative position of the normal vector 16 with respect to the detectors 5a, 5b, i.e. by comparison of the position of the vector 16 with the position of the detectors 5a, 5b. Furthermore, the tilt of the sensor 1 may be determined by defining a reference vector for a horizontalized orientation of the sensor 1 and deriving the tilt by comparison of the position of the calculated normal vector with respect to the reference vector.

Figure 5A:
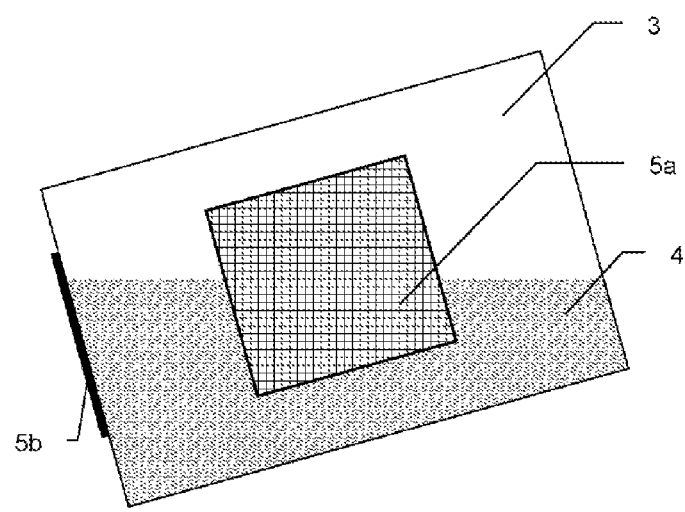
FIGS. 5a-b show the side view of a fifth embodiment of the tilt sensor according to the invention in the tilted state.
Figure 5B:
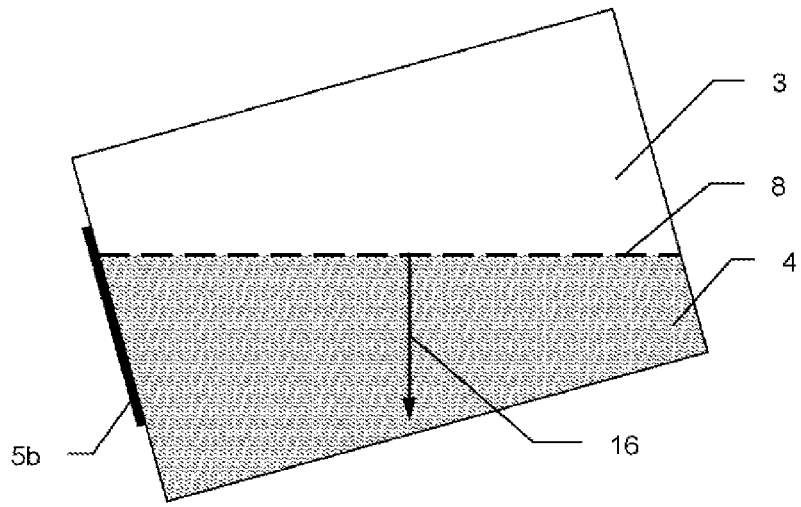

For illustration, FIGS. 5a and 5b show a sensor similar to that of FIG. 2, but without the sources of electromagnetic radiation, in a tilted state. The medium 4 has a horizontalized orientation corresponding to the tilt of the sensor 1 and therefore a modified orientation relative to the container 3 and to the detectors 5a, 5b. The detectors 5a, 5b are covered to different degrees by the medium 4 in the state shown, and therefore record different projections in comparison with the horizontalized state. FIG. 5b represents the interface 8 of the medium 4 and an associated normal vector 16. Clearly visible here is the change in the relative position of this vector 16 with respect to the detector 5b, i.e. the direction of the vector in this state is no longer parallel to the detector 5b, i.e. no longer perpendicular to its recording direction. By comparison of the direction of the vector 16 with the position of the detector 5b, it is thus possible to derive the tilt of the sensor 1 in one axis. This comparison may be carried out jointly for further detectors and therefore for at least a second axis, and the tilt may be determined jointly therefrom for two axes. The recording of the projections and their conversion into signals, and the determination of the tilt, may furthermore be carried out continuously, in particular with cumulation of recorded signals.

Figure 6A:
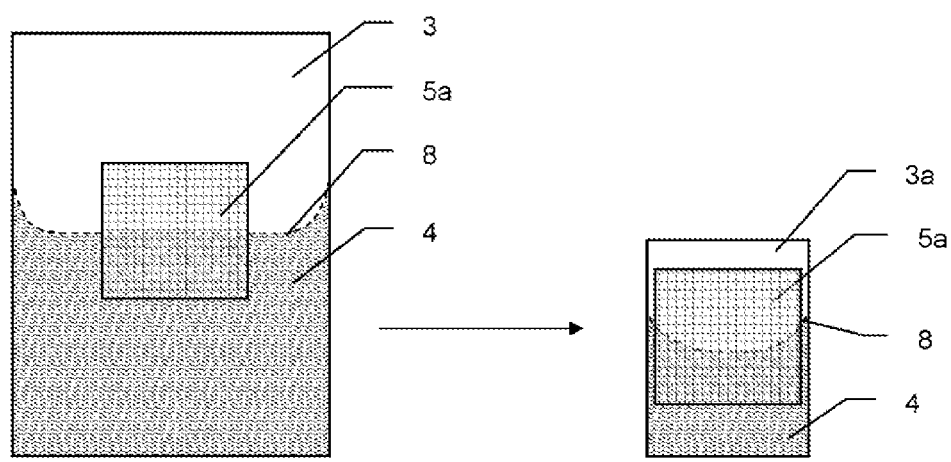
FIGS. 6a-b show four embodiments of a container with detectors for a tilt sensor according to the invention.

FIG. 6a shows two embodiments of a container 3, 3a for a tilt sensor, which differ substantially from one another in terms of their size. The interface 8 of the medium 4 exhibits a curved profile at the edge of the container 3, 3a, which is due to wetting of the container 3, 3a by the medium 4. With increasing miniaturization of the container 3, this effect has increased repercussions on the profile of the interface 8, and for small embodiments of the container 3a may comparatively dominate, and in particular completely prevent, the formation of an at least partially straight boundary line profile of the medium 4. Therefore, for constant detector sizes, the proportion of curved boundary line profiles which are projected onto the detectors 5a likewise increases and must be taken into account for the determination of the tilt.

Figure 6B:
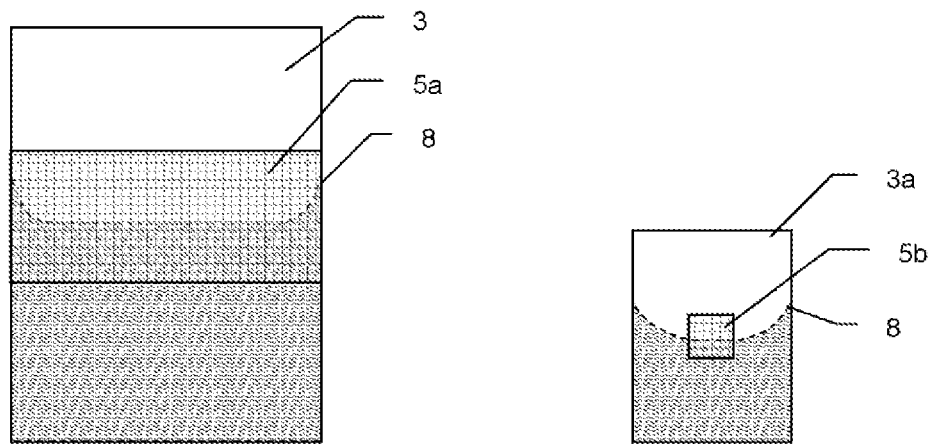

As shown in FIG. 6b, the dimensioning of the detectors 5a, 5b may be adapted. In order to increase the accuracy during the determination of the tilt, the detector 5a may be adapted in its size to the dimensions of the container 3 and its field of view can thereby be optimized. In this way, for example, a comparatively large region with a planar profile of the interface 8 can be recorded. For the container 3a, on the other hand, a reduced-size detector 5b may be provided in order, for example, to be able to exclude projections of strongly curved boundary lines in edge regions.

Figure 7A:
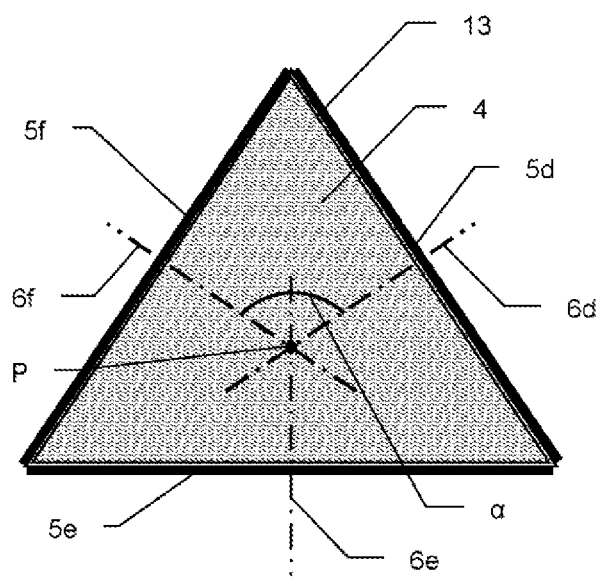
FIG. 7a shows a plan view of a sixth embodiment of the tilt sensor according to the invention.
Figure 7B:
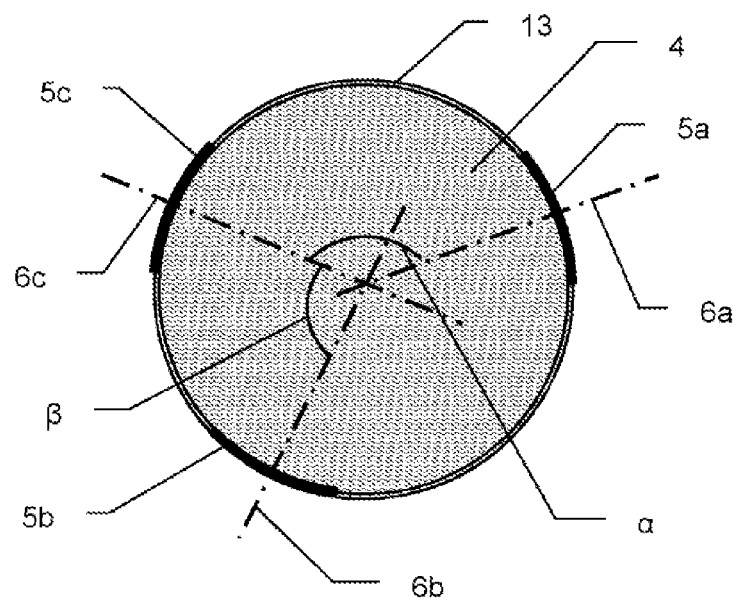
FIG. 7b shows a seventh embodiment of the tilt sensor according to the invention with a round base surface in plan view.
Figure 7C:
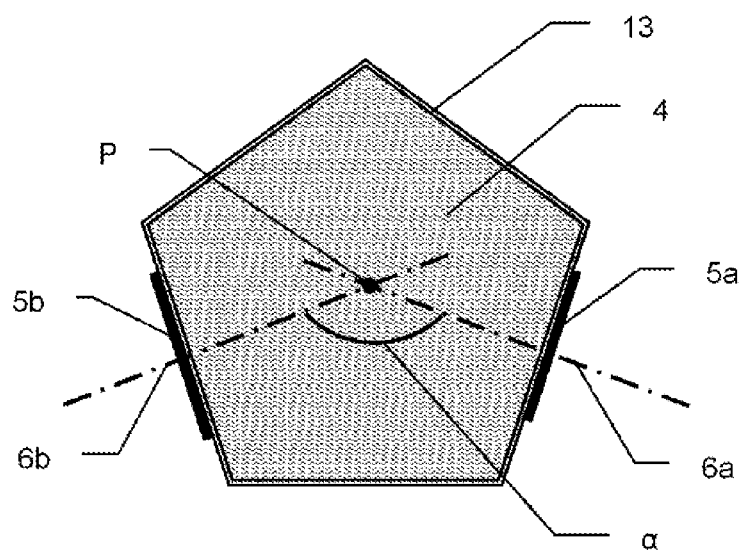
FIG. 7c shows a plan view of an eighth embodiment of the tilt sensor according to the invention with a pentagonal base surface.

FIGS. 7a to 7c respectively show a plan view of a tilt sensor 1 according to the invention perpendicularly to the base surface of the sensor. In FIG. 7a, the embodiment of the tilt sensor 1 has a container with a triangular base surface and with container walls 13 which are perpendicular to this base surface, the medium 4 occupying a part of the volume of the container. The three detectors 5d, 5e, 5f are in this case configured so that they correspond in their dimensioning to the container walls 3 and cover the entire area thereof, and so that each detector 5d, 5e, 5f defines a recording direction 6d, 6e, 6f, the latter intersecting at a point P, in particular inside the container at a defined height above the surface centroid of the base surface. The detector 5d, 5e, 5f are furthermore arranged at an angle α to one another with respect to their recording directions 6d, 6e, 6f, so that the detector 5f lies with its recording direction 6f in the plane spanned by the recording directions 6d, 6e.

FIG. 7b shows a further embodiment of a tilt sensor 1 according to the invention, the latter being configured with a round base surface and the container wall 13 again being perpendicular to this surface.

In this embodiment as well, the container is partially filled with a medium 4 and the detectors 5a, 5b, 5c are arranged on the container wall 13 in such a way that their recording directions 6a, 6b, 6c intersect at a point. Furthermore, the detectors 5a, 5b, 5c respectively have shapes which correspond to the shape, here in particular the curvature, of the container wall. As a result, in this arrangement an accurate and good projection of the interface of the medium 4 onto the detectors 5a, 5b, 5c can be recorded. The detectors 5a, 5b, 5c in this exemplary embodiment are distributed over the container wall with different angular spacings. This leads to different angles α and β between the recording directions 6a, 6b, 6c, although other alternative embodiments of this sensor 1 may have equally large angles α, β between the recording directions 6a, 6b, 6c. Furthermore, the recording direction 6c of one of the detectors 5c may be arranged at an angle to a plane spanned by the other two detectors 5a, 5b.

The embodiment represented in FIG. 7b is a special case here, since the projection of the liquid surface onto the image sensors of the detectors 5a, 5b, 5c gives a subsection of a curved line.

FIG. 7c shows a third embodiment of the sensor. Geometrically, this variant differs from the previously described embodiments by its pentagonal base surface. The container walls 13 are here again perpendicular to the base surface and the medium 4 partially fills the container. In addition, two detectors 5a, 5b are arranged in such a way that their recording directions 6a, 6b intersect at an angle α at a point P inside the container. One or both of the detectors may be configured as line detectors here, in which case their recording directions 6a, 6b may be oriented parallel to the base surface. The walls 13 of the container are furthermore configured so as to be transparent, the two detectors 5a, 5b lying on the outside of the container walls 13 so that the recording of projections formed is carried out after they have passed through the transparent walls 13.

Figure 8A:
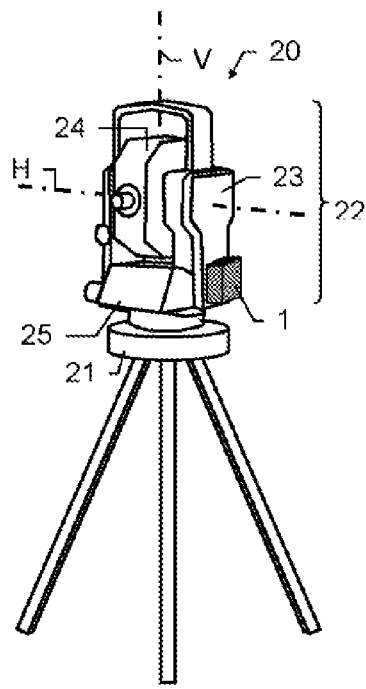
FIGS. 8a-b show a geodetic surveying device, formed as a total station, having a tilt sensor according to the invention.
Figure 8B:
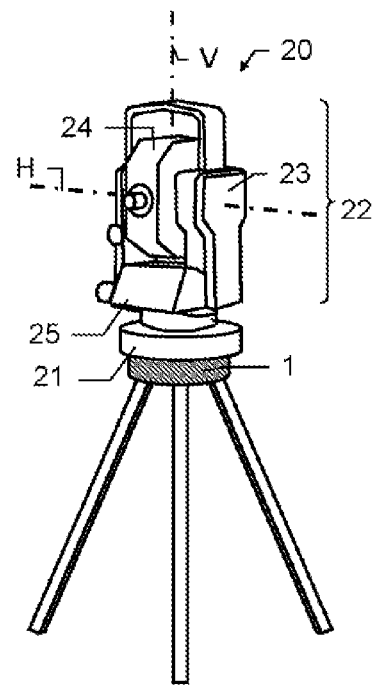

FIGS. 8a and 8b respectively show a geodetic surveying device 20, formed as a total station, for measuring horizontal angles, vertical angles and distances to a distant target object.

The total station is arranged on a stand, a base 21 of the total station being connected directly and rigidly to the stand. The main body of the total station, which is also referred to as the upper part 22, can be rotated relative to the base 21 about a vertical upright axis V. The upper part 22 has a support 23, for example formed by two columns, a sighting instrument 24 mounted between the columns rotatably about the horizontal inclination axis H, and an electronic display/control unit 25. The display/control unit 25 may be formed in a known way in order to control the surveying device 20 as well as in order to process, display and store measurement data. In order to determine the orientation of the total station, a tilt sensor 1 according to the invention is additionally arranged thereon. In the embodiment shown in FIG. 8a, a sensor 1 is fitted for example laterally on the support 23. A further exemplary embodiment of a total station having a tilt sensor 1 is represented in FIG. 8b. The tilt sensor 1 in this case lies underneath the base 21 of the surveying device 20. In both embodiments, the data provided by the tilt sensor 1 can be combined and processed further with the angle and distance measurement data of the total station. These recorded measurement data are delivered to the display/control unit 25 and processed by the latter, so that the location of the target point relative to the total station can be determined, optically displayed and stored by the display/control unit 25.

Figure 9:
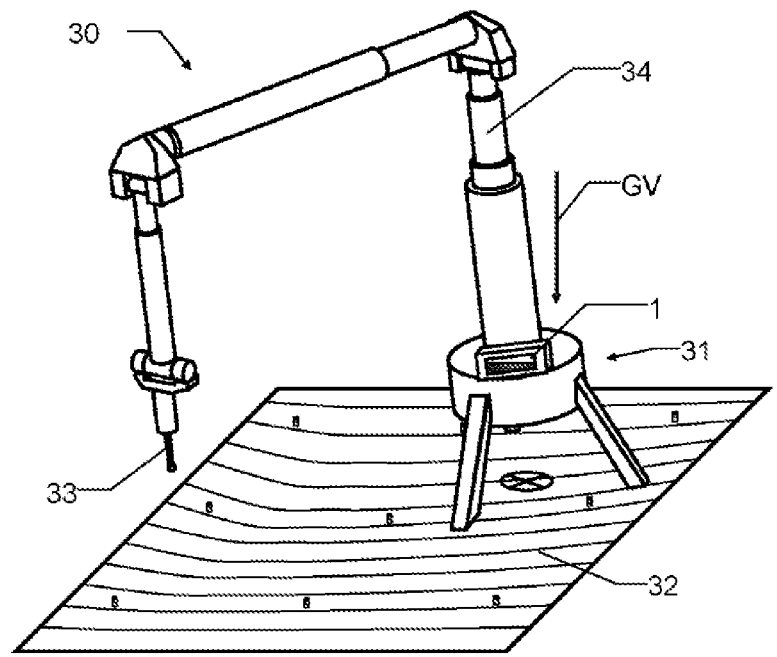
FIG. 9 shows a coordinate measurement machine having a tilt sensor according to the invention.

FIG. 9 shows a coordinate measurement machine 30 having a base 31 and a tilt sensor 1 according to the invention for measuring the tilt of this base 31 relative to the gravitation vector GV. The supporting surface 32 on which the measurement machine 30 stands is tilted relative to the horizontal, so that said measurement machine is not oriented in a horizontalized manner. By the determination according to the invention of the exact tilt of the base 31 relative to the gravitation vector GV, or relative to the horizontal, this tilt can be introduced into the calculation of coordinates of points that are measured by a sampling member 33, which is in turn arranged at the end of an articulated arm 34, and be employed for the location correction in the calculation.

What is claimed is:

1. A tilt sensor for a device, comprising:
   a container holding a flowable medium, the position of the medium relative to the container being tilt-dependent and the container having a polygonal or elliptical base surface;
   a source of electromagnetic radiation for generating projections of at least a part of an interface of the medium;
   at least two detectors, each of which being adapted for recording one of the projections and for conversion into signals and having a recording direction, wherein the recording directions of the detectors are arranged and angled to one another; and
   an evaluation unit for determining the tilt in a first axis and in a second axis from the signals of the at least two detectors, wherein the tilt for the first axis is determined jointly from a combination of the signals, and the tilt for the second axis is determined jointly from a combination of signals.

2. The tilt sensor as claimed in claim 1, wherein the container has a triangular, base surface.

3. The tilt sensor as claimed in claim 1, wherein the container has a circular, base surface.

4. The tilt sensor as claimed in claim 1, wherein the detectors are arranged with their recording directions parallel to the base surface.

5. The tilt sensor as claimed in claim 1, wherein the detectors are configured as line sensors.

6. The tilt sensor as claimed in claim 1, wherein the detectors are configured as surface sensors.

7. The tilt sensor as claimed in claim 1, wherein the detectors are configured with dimensioning that covers the container.

8. The tilt sensor as claimed in claim 1, further comprising a third detector, the recording direction of which lies in a plane formed by the recording directions of the at least two detectors.

9. The tilt sensor as claimed in claim 1, further comprising a third detector, the recording direction of which is oriented at an angle to a plane formed by the recording directions of the at least two detectors.

10. The tilt sensor as claimed in claim 1, wherein the detectors are arranged in such a way that their recording directions intersect at one point.

11. The tilt sensor as claimed in claim 1, wherein the detectors are arranged in such a way that their recording directions intersect inside the container at a defined height above a surface centroid of the base surface of the container.

12. The tilt sensor as claimed in claim 1, wherein the detectors are arranged at adjacent surfaces of the container.

13. A method for determining a tilt of a device, with a flowable medium whose relative position with respect to a container holding it is tilt-dependent, for a first axis and second axis, the method comprising:
generating at least two projections of at least a part or a common part, of an interface of the medium;
recording the respective projections by a respectively assigned one of at least two detectors and conversion of the respectively recorded projection into signals, the interface being recorded from two recording directions at an angle to one another; and
determining the tilt from the signals, wherein the tilt for the first axis is determined jointly from a combination of the signals, and the tile for the second axis is determined jointly from a combination of signals.

14. The method as claimed in claim 13, wherein during the determination of the tilt, the signals are combined by determining a surface therefrom, the surface representing the interface of the medium.

15. The method as claimed in claim 14, wherein during the determination of the tilt, a normal vector of the surface is calculated and the tilt is determined in two axes with the aid of the position of the normal vector relative to the detectors.

16. The method as claimed in claim 13, wherein during the determination of the tilt, the signals are combined by determining a plane, therefrom, the surface representing the interface of the medium and approximating a profile of the interface.

17. The method as claimed in claim 13, wherein the projection is resolved by the respective detector into image points so that the signals represent the interface as a-two-dimensional point clouds.

18. The method as claimed in claim 17, wherein a straight line is respectively derived from the point clouds.

19. The method as claimed in claim 18, wherein the straight line is derived from the point clouds with meniscus correction.

20. The method as claimed in claim 18, wherein the straight line is derived from the point clouds by fitting calculation.

21. The method as claimed in claim 17, wherein a common surface is derived directly from the point clouds of the at least two detectors.

22. The method as claimed in claim 17, wherein a common surface is derived directly from the point clouds of the at least two detectors by fitting calculation.

23. The method as claimed in claim 17, wherein a quality value for a calculation of a surface and/or straight lines is determined from the point clouds.

24. The method as claimed in claim 23, wherein an illumination intensity for the generation of the at least two projections is adapted as a function of the quality value.

25. The method as claimed in 27, wherein a reference vector for a horizontalized orientation of the device is defined and the tilt is determined by comparing the position of the calculated normal vector with respect to the reference vector.

26. The method as claimed in claim 13, wherein the recording of the projections and their conversion into signals, and the determination of the tilt, are carried out continuously.

27. The method as claimed in claim 13, wherein the recording of the projections and their conversion into signals, and the determination of the tilt, are carried out continuously with a cumulation of recorded signals.

* * * * *